(12) United States Patent
Kobayashi et al.

(10) Patent No.: US 10,830,609 B2
(45) Date of Patent: Nov. 10, 2020

(54) MEASURING DEVICE AND METHOD OF CONTROLLING THE SAME

(71) Applicant: Mitutoyo Corporation, Kanagawa (JP)

(72) Inventors: Hirokazu Kobayashi, Saitama (JP); Shun Mugikura, Kanagawa (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 16/138,229

(22) Filed: Sep. 21, 2018

(65) Prior Publication Data

US 2019/0086232 A1 Mar. 21, 2019

(30) Foreign Application Priority Data

Sep. 21, 2017 (JP) .................... 2017-181643

(51) Int. Cl.
  *G01D 3/032* (2006.01)
  *G01D 7/00* (2006.01)
  *G01D 21/00* (2006.01)

(52) U.S. Cl.
  CPC ............. *G01D 3/032* (2013.01); *G01D 7/00* (2013.01); *G01D 21/00* (2013.01)

(58) Field of Classification Search
  CPC ............ G01D 3/00; G01D 3/032; G01D 7/00; G01D 21/00

USPC ........................................................ 73/866.3
See application file for complete search history.

(56) References Cited

U.S. PATENT DOCUMENTS

| | | | |
|---|---|---|---|
| 5,278,552 A | * | 1/1994 | Ito .................... G01R 19/25 340/870.05 |
| 2016/0084866 A1 | * | 3/2016 | Teratani ............... G01P 1/07 701/99 |

FOREIGN PATENT DOCUMENTS

JP 63-303393 12/1988

* cited by examiner

*Primary Examiner* — Benjamin R Schmitt
(74) *Attorney, Agent, or Firm* — Oblon, McClelland, Maier & Neustadt, L.L.P.

(57) ABSTRACT

There is provided a measuring device that suppresses flickering of display values displayed on a display and, at the same time, improves response of the measuring device. A measuring device includes a storage that stores information about the measuring device, control circuitry that calculates measurement results, and a display that displays the measurement results calculated by the control circuitry. The control circuitry determines whether or not filtering for suppression of a variation in display values $P_n$ displayed on the display is to be executed and executes the filtering in response to the determination that the filtering is to be executed.

8 Claims, 8 Drawing Sheets

MEASURING DEVICE AND METHOD OF CONTROLLING THE SAME

CROSS-REFERENCE TO RELATED APPLICATION

This non-provisional application claims priority under 35 U.S.C. § 119(a) from Japanese Patent Application No. 2017-181643, filed on Sep. 21, 2017, the entire contents of which are incorporated herein by reference.

BACKGROUND

Technical Field

The present invention relates to a measuring device including a display unit that displays information.

Background Art

Measuring devices including a storage unit that stores information about a measuring device, a control unit that calculates measurement results, and a display unit that displays measurement results calculated by the control unit have hitherto been known. Measuring devices include, for example, dial gages, calipers, indicators, linear scales, and micrometers.

An example of measuring devices is a dial gage that brings a probe provided at a tip of a spindle into contact with a measurement object and measures a dimension or the like from a displacement of the probe. In the dial gage, despite that the probe and the measurement object are in contact with each other in a rested state, minimum digit values in the display values of the measurement results or the like displayed on the display unit are sometimes varied. Specifically, the display unit sometimes executes display while frequent switching of minimum digit values of display values, for example, "4," "5," and "6." is performed Frequent switching (flickering) of minimum digit values of display values makes it impossible for users of dial gages (measuring devices) to accurately read measurement results due to instable minimum digit values of display values, posing a problem that the reliability of the measuring device is lowered.

To overcome this problem, for example, JP 63-303393 A discloses a digital display-type caliper (a measuring device) including: an encoder that detects a relative displacement quantity of a main scale and a slider; a digital display device (a display unit) that displays display values based on output signals from the encoder; a first data register and a second data register that store display digits and fractional digits (non-display digits) of the display values; and a stable display circuit that executes a stable display method for display values.

The stable display circuit executes a first step of an identical initial value in each of a first data register and a second data register, a second step of storing, in a first data register, a display digit in a display value based on an output signal from an encoder, comparing the stored display digit value with a display digit value stored in a second data register, and selecting an offset value according to predetermined conditions, and a third step of adding the selected offset value and the display value stored in the first data register, storing the value obtained by the addition in the second data register, and displaying the display digit value obtained by the addition on a digital indicator.

The stable display circuit stabilizes the display value displayed on the digital indicator by repeating execution of the second step and the third step. That is, in a stable display circuit for a digital display-type caliper, flickering of the minimum digit value in the display value displayed on the digital indicator is suppressed by repeatedly acquiring the display value based on the output signal from the encoder and executing the stabilization method for the display value.

SUMMARY OF THE INVENTION

Problems to be Solved by the Invention

In the measuring device, however, for example, in the movement of a probe or a measurement object in a dial gage, the movement causes a variation in a display value displayed on the display unit, making it necessary to execute the stabilization method (stabilization processing) each time when the variation in the display value occurs. Accordingly, in the measuring device, the update of the display value displayed on the display unit is delayed, for example, due to an unsatisfactory stabilization speed. Thus, the measuring device suffers from a problem of lowered response.

An object of the present invention is to provide a measuring device that can suppress flickering of display values displayed on a display unit and, at the same time, can improve response of the measuring device.

Means for Solving the Problems

The measuring device according to the present invention includes: a storage unit that stores information about the measuring device; a control unit that calculates a measurement result; and a display unit that displays the measurement result calculated by the control unit, wherein the control unit includes: a filtering determination unit that determines whether or not filtering for suppression of a variation in display values displayed on the display unit is to be executed; and a filtering execution unit that, when the filtering determination unit has determined that the filtering is to be executed, executes the filtering.

According to the present invention, when the control unit allows the filtering determination unit to determine whether or not the variation in display value is to be suppressed for stabilization and the filtering determination unit has determined that the display value should be stabilized, the control unit allows the filtering execution unit to execute filtering, so that flickering of the display value displayed on the display unit can be suppressed. Accordingly, since the control unit executes filtering when a variation in the display value should be suppressed for stabilization, the delay of update of the display value displayed on the display unit, for example, due to an unsatisfactory filtering speed can be prevented. Thus, the measuring device can suppress flickering of display values displayed on a display unit and, at the same time, can improve response of the measuring device.

In this case, preferably, the storage unit includes a first storage unit that stores the display value, and a second storage unit that stores a past display value displayed on the display unit, the control unit includes a deviation calculation unit that calculates a deviation between the display value and the past display value, and the filtering determination unit determines, based on the deviation calculated in the deviation calculation unit, whether or not filtering is to be executed.

According to the construction, the filtering determination unit can determine, based on the display value and the past display value, whether or not filtering is to be executed. Thus, the control unit can execute filtering of the display value displayed on the display unit based on information stored in the storage unit at proper timing.

In this case, preferably, the control unit includes a stabilization unit that executes stabilization to stabilize the display value, and the display unit displays the display value stabilized in the stabilization unit.

Here filtering refers to, for example, smoothing that is filtering and that can be expressed as mathematical calculation. Smoothing refers to, for example, processing by weighed moving average or exponential smoothing filtering according to moving average or binominal expansion coefficient.

On the other hand, stabilization refers to rounding or hysteresis processing. Rounding is replacement of a display value displayed on the display unit with an integral multiple value of a given rounding width, and hysteresis processing is processing that provides hysteresis to rounding width in the rounding.

According to the present invention, the stabilization unit can stabilize the display value by stabilization. Accordingly, the measuring device can ensure the stability of the display value.

In this case, preferably, the filtering execution unit executes, for a smoothed display value $P'_n$ that is a display value obtained by the execution of the filtering, calculation by a formula (1) based on the display value $P_n$, the past display value $P_{n-1}$, and the smoothing coefficient satisfying $0<\alpha_n<1$:

$$P'_n = \alpha_n \times P_n + (1-\alpha_n) \times P_{n-1} \tag{1}$$

and the smoothed display value $P'_n$ is replaced with the display value $P_n$ stored in the first storage unit to store the smoothed display vale $P'_n$ as the display value $P_n$ in the first storage unit so as to satisfy a formula (2):

$$P_n = P'_n \tag{2}$$

According to the construction, the filtering execution unit can calculate the smoothed display value $P'_n$ by the formula (1) based on the display value $P_n$, the past display value $P_{n-1}$, and the smoothing coefficient $\alpha_n$ satisfying $0<\alpha_n<1$. That is, the filtering execution unit can calculate the smoothed display value $P'_n$ by the formula (1) that is simple product-sum operation. Thus, in the measuring device, the filtering execution unit can be easily implemented.

Further, since the filtering execution unit stores the smoothed display value $P'_n$, after replacement of the smoothed display value $P'_n$ with the display value $P_n$ stored in the first storage unit, as the display value $P_n$ so as to satisfy a formula (2) in the first storage unit, when the smoothing has not been executed, the display value $P_n$ is adopted as the display value $P_n$ while, when the smoothing has been executed, the smoothed display value $P'_n$ can be adopted as the display value $P_n$. When the control unit includes the stabilization unit, the control unit can execute stabilization for the display value $P_n$ (smoothed display value $P'_n$) both when the filtering has been executed and when the filtering has not been executed.

In this case, preferably, the smoothing coefficient $\alpha_n$ satisfies a formula (3) based on an integer $\beta_n$ that is larger than 0:

$$\alpha_n = \frac{1}{2}\beta_n \tag{3}$$

According to the construction, even in use of a control unit having a limited arithmetic processing capacity, in the measuring device, the filtering execution unit can be implemented. Thus, the measuring device can suppress flickering of the display digit $P_n$ while realizing a lowered cost.

Preferably, the smoothing coefficient $\alpha_n$ satisfies, for the number of times n of execution of the filtering determined in the filtering determination unit, the formula (3):

$$\alpha_n = \frac{1}{2}\beta_n \tag{3}$$

wherein $\beta_n=1$ for n and n+1; $\beta_n=2$ for n+2 and n+3; and $\beta_n=3$ for n+4 or more.

According to the construction, the smoothing coefficient $\alpha_n$ can stepwise vary the smoothing intensity in the smoothing in the filtering execution unit. Thus, the filtering execution unit can improve convergence on the smoothed display value $P'_n$ to realize a high resolution.

In this case, preferably, the deviation calculation unit calculates a deviation by a formula (4) based on the display value $P_n$ and the past display value $P_{n-1}$:

$$\text{deviation} = |P_n - P_{n-1}| \tag{4}$$

According to the construction, even in use of a control unit having a limited arithmetic processing capacity, in the measuring device, the deviation calculation unit can be implemented. Thus, the measuring device can suppress flickering of the display digit $P_n$ while realizing a lowered cost.

In this case, preferably, the deviation calculation unit calculates a deviation by a formula (5) based on the positive integer k, the display value $P_n$, and the past display value $P_{n-1}$:

$$\text{deviation} = k \times \text{standard deviation}(P_n, P_{n-1}, \ldots, P_1, P_0) \tag{5}$$

According to the construction, the control unit can allow the filtering determination unit to properly determine whether or not filtering is to be executed, based on a deviation calculated in the deviation calculation unit. Thus, the control unit can allow the filtering execution unit to execute filtering for the display value $P_n$ displayed on the display unit at proper timing.

In this case, preferably, the display value and the past display value have a display digit displayed on the display unit and a non-display digit that is a digit lower than the display digit and that is not displayed on the display unit, the filtering execution unit executes filtering for the non-display digit, and the stabilization unit executes stabilization for the non-display digit.

According to the construction, the filtering execution unit and the stabilization unit can execute processing without displaying, on the display unit, a variation in the display value caused by executing the filtering and the stabilization. Thus, the measuring device can suppress flickering of display values displayed on a display unit and, at the same time, can improve response of the measuring device.

The measuring device according to the present invention includes: a storage unit that stores information about the measuring device;
a control unit that calculates a measurement result; and
a display unit that displays the measurement result calculated by the control unit, wherein the control unit includes:
a deviation calculation unit that calculates a deviation by the formula (4);
a filtering determination unit that determines, based on the deviation calculated in the deviation calculation unit, whether or not filtering is to be executed; and a filtering execution unit that calculates the smoothed display value $P'_n$ by the formula (1) based on the display value $P_n$, the past display value $P_{n-1}$, and the smoothing coefficient $\alpha_n$ that satisfies $0<\alpha_n<1$ and satisfies the formula (3) based on an integer $\beta_n$ that is larger than 0.

According to the present invention, even in use of a control unit having a limited arithmetic processing capacity, in the measuring device, the deviation calculation unit and the filtering execution unit can be implemented. Thus, the measuring device can suppress flickering of the display digit $P_n$ while realizing a lowered cost.

According to the present invention, there is provided a method of controlling a measuring device including: a storage unit that stores information about the measuring device;
a control unit that calculates measurement results; and
a display unit that displays the measurement results calculated by the control unit, wherein the storage unit includes:
a first storage unit that stores a display value $P_n$; and
a second storage unit that stores a past display value displayed on the display unit,
the control unit includes:
a deviation calculation step of calculating a deviation between the display value and the past display value;
a filtering determination step of determining, based on the deviation calculated in the deviation calculation step, whether or not the filtering is to be executed;
a filtering execution step of executing the filtering when a determination is made that the filtering is to be executed; and
a stabilization step of executing the stabilization, wherein
the display unit displays the display value stabilized by the stabilization in the stabilization step.

According to the present invention, the measuring device can suppress flickering of display values displayed on a display unit and, at the same time, can improve response of the measuring device.

DETAILED DESCRIPTION OF THE EMBODIMENTS

First Embodiment

A first embodiment of the present invention will be described with reference to the drawings.

Figure 1:
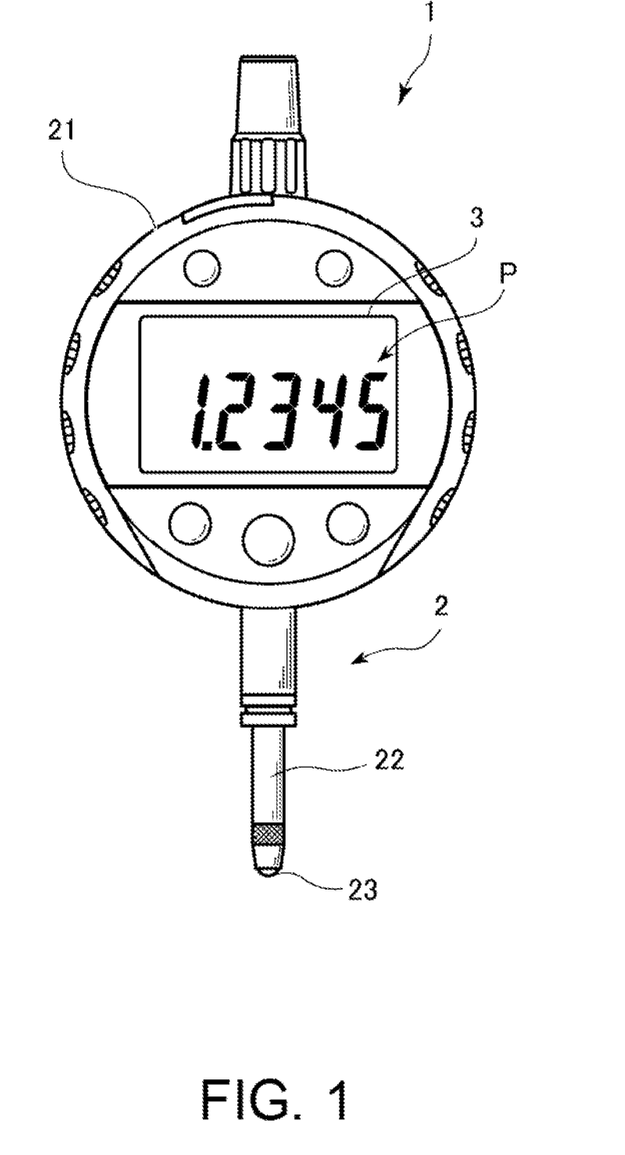
FIG. 1 is a front view illustrating a measuring device in a first embodiment of the present invention.

FIG. 1 is a front view illustrating a measuring device in a first embodiment of the present invention.

A measuring device 1, as illustrated in FIG. 1, is a dial gage including a measuring unit 2 that acquires measurement information for calculation of measurement results from a measurement object, and a display unit 3 (display) that displays the measurement results.

The measuring device 1 includes, as the measuring unit 2, a disk-shaped body 21, a spindle 22 provided so as to be vertically extended through the body 21, and a probe 23 that is a tip of the spindle 22 and that is provided opposite to the body 21.

A display unit 3 is a liquid crystal panel provided substantially at a center of a front surface of the body 21.

The display unit 3 displays display values P such as measurement results. The display unit 3 is not limited to liquid crystal panel and may be an organic electro-luminescence (EL) or an electronic paper. Further, the display unit 3 may not be provided substantially at a center of the front surface of the body 21 and may be provided outside the body 21 in such a state that the display unit 3 is connected to the measuring device 1 in a wired or wireless manner. In summary, the display unit 3 may be any one as long as information such as measurement results can be displayed.

Here a display value P that is actually displayed on the display unit 3 is, for example, "1.2345" as illustrated in FIG. 1. Measurement results (display values $P_n$) calculated by a control unit 5 (control circuitry) (see FIG. 2) that will be described later, however, are higher resolved values than the display value P that is actually displayed on the display unit 3. For this reason, display values $P_n$ calculated by the control unit 5 are, for example, "1.23456" including digit values not illustrated in the display unit 3.

Thus, the display value $P_n$ has a display value P (a display digit P) actually displayed on the display unit 3, and a non-display digit that is a digit lower than the display digit P and that is not displayed on the display unit 3. In the first embodiment, the minimum digit of the display value $P_n$ refers to the minimum digit in the non-display digit, and a non-display digit that is adjacent to right of "5" in "1.2345" of the display digit P displayed on the display unit 3 in FIG. 1 is the minimum digit.

In the measuring device 1, the probe 23 of the spindle 22 is brought into contact with a measurement object (not shown), and, for example, a dimension of the measurement object is measured from a displacement of the probe 23.

Figure 2:
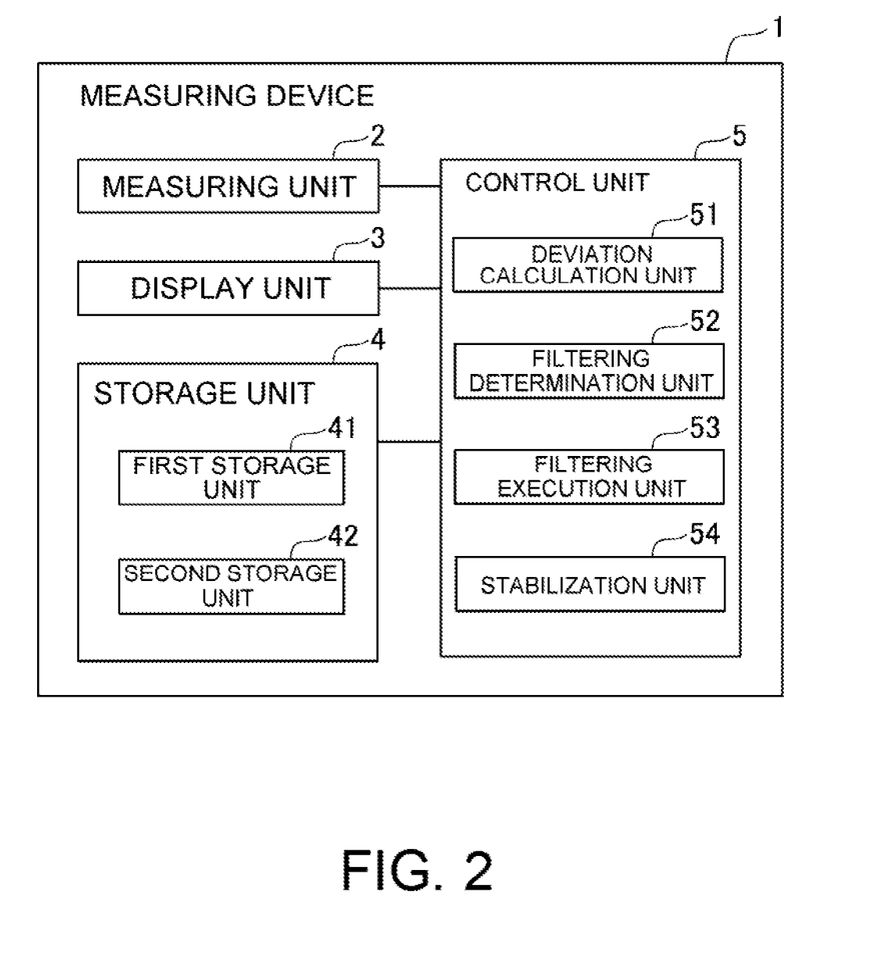
FIG. 2 is a block diagram illustrating a control unit in the measuring device.

FIG. 2 is a block diagram illustrating a control unit in the measuring device.

The measuring device 1, as illustrated in FIG. 2, further includes a storage unit 4 (storage) that stores information about the measuring device 1, and a control unit 5 that calculates measurement results.

As illustrated in FIG. 2, the storage unit 4 includes a first storage unit 41 (first storage) that stores a display value $P_n$ displayed on the display unit 3, and a second storage unit 42 (second storage) that stores a past display value $P_{n-1}$ displayed on the display unit 3.

The first storage unit 41 stores the display value $P_n$ having a display digit P and a non-display digit.

The second storage unit 42 stores a past display value $P_{n-1}$ having a display digit P and a non-display digit. The past display digit $P_{n-1}$ is specifically a past display value $P_{n-1}$ (previous display value $P_{n-1}$) that is second to the last display value $P_n$ displayed on the display unit 3 before update to the display value $P_n$.

The control unit 5 includes: a deviation calculation unit 51 (implemented by the control circuitry) that calculates a deviation; a filtering determination unit 52 (implemented by the control circuitry) that determines whether or not filtering is to be executed; a filtering execution unit 53 (implemented by the control circuitry) that executes the filtering; and a stabilization unit 54 (implemented by the control circuitry) that executes stabilization to stabilize the display digit P in the display value $P_n$.

The deviation calculation unit 51 calculates a deviation based on the display value $P_n$ stored in the first storage unit 41 and the previous $P_{n-1}$ stored in the second storage unit 42.

The filtering determination unit 52 determines, based on the deviation calculated in the deviation calculation unit 51, whether or not filtering is to be executed. Here the filtering refers to processing that suppresses a variation in the display value $P_n$ to stabilize the display digit P and, in the first embodiment, refers to smoothing. When the filtering determination unit 52 has determined that smoothing that is filtering is to be executed, the filtering execution unit 53 executes smoothing to calculate a smoothed display value $P'_n$ that is a smoothed display value $P_n$. Specifically, the filtering execution unit 53 executes smoothing for the minimum digit value of the non-display digit in the display value $P_n$ to calculate a smoothed display value $P'_n$ having a smoothed non-display digit.

Calculation of the smoothed display value $P'_n$ in the filtering execution unit 53 is followed by replacement of the display value $P_n$ having the display digit P and the non-display digit stored in the first storage unit 41 with the smoothed display value $P'_n$ having the display digit P and the smoothed non-display digit. The filtering execution unit 53 stores the smoothed display value $P'_n$ as the display value $P_n$, in the first storage unit 41.

The stabilization unit 54 executes, for the display value $P_n$ stored in the first storage unit 41, stabilization to stabilize the display digit P in the display value $P_n$ displayed on the display unit 3. Specifically, the stabilization unit 54 executes rounding and hysteresis processing for the non-display digit in the display value $P_n$ stored in the first storage unit 41. The display unit 3 displays the display digit P in the display value $P_n$ stabilized by the stabilization unit 54.

Figure 3:
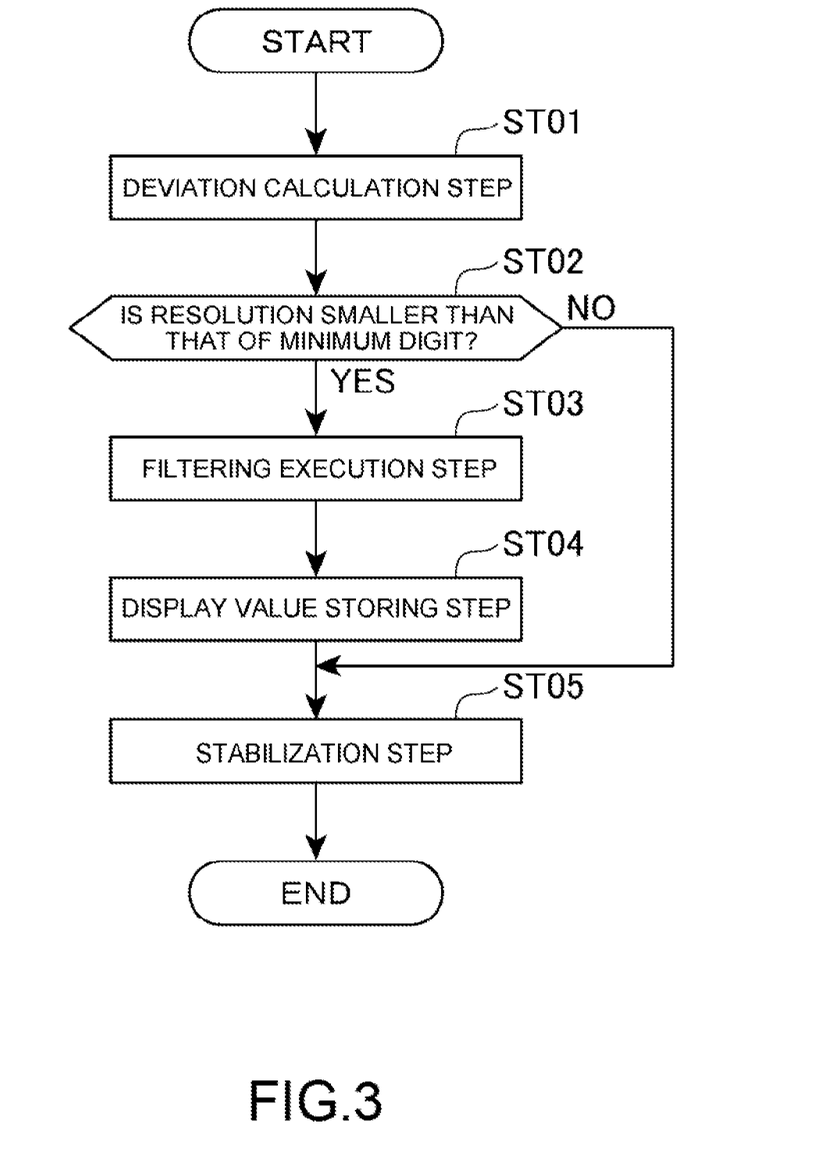
FIG. 3 is a flow chart illustrating a method of controlling the measuring device.

FIG. 3 is a flow chart illustrating a method of controlling the measuring device.

The method of controlling a measuring device 1 will be described with reference to FIG. 3.

At the outset, the deviation calculation unit 51 in the control unit 5 in the measuring device 1 calculates a deviation between the display value $P_n$ stored in the first storage unit 41 in a deviation calculation step and the previous display value $P_{n-1}$ stored in the second storage unit 42. Specifically, the deviation calculation unit 51 calculates a deviation by a formula (4) based on the display value $P_n$ having the display digit P and the non-display digit and the previous display value $P_{n-1}$ having the display digit P and the non-display digit (step ST01).

$$\text{deviation} = |P_n - P_{n-1}| \tag{4}$$

Next, the filtering determination unit 52 executes a filtering determination step of, based on the deviation calculated in the deviation calculation unit 51, whether or not filtering is to be executed. Specifically, the filtering determination unit 52 determines whether or not the deviation is smaller than the resolution of the minimum digit in the non-display digit in the display value $P_n$ (step ST02).

When the filtering determination unit 52 has determined that the deviation is smaller than the resolution of the minimum digit in the non-display digit in the display value $P_n$ (YES in step ST02), the filtering execution unit 53 executes a filtering execution step (step ST03). When the filtering determination unit 52 has determined that the deviation is larger than the resolution of the minimum digit in the non-display digit in the display value $P_n$ (NO in step ST02), the stabilization unit 54 executes a stabilization step (step ST05).

When YES in step ST02, the filtering execution unit 53 calculates a smoothed display value $P'_n$ that is a display value after execution of the smoothing by a formula (1) based on the display value $P_n$, the previous display value $P_{n-1}$, and a smoothing coefficient $\alpha_n$ satisfying $0 < \alpha_n < 1$ (step ST03).

$$P'_n = \alpha_n \times P_n + (1 - \alpha_n) \times P_{n-1} \tag{1}$$

In this case, the smoothing coefficient $\alpha_n$ is set so as to satisfy a formula (3) based on an integer $\beta_n$ that is larger than 0.

$$\alpha_n = 1/2^{\beta_n} \tag{3}$$

After the calculation of the smoothed display value $P'_n$, the filtering execution unit 53 executes a display value storing step of replacing the smoothed display value $P'_n$ with the display value $P_n$ stored in the first storage unit 41 to store the smoothed display value $P'$; in the first storage unit 41 as the display value $P_n$ so as to satisfy a formula (2) (step ST04).

$$P_n = P'_n \tag{2}$$

When NO in step ST02 or after the display storage step (step ST04), the stabilization unit 54 executes a stabilization step of performing stabilization to stabilize the display digit P in the display value $P_n$. Specifically, the stabilization unit 54 executes rounding and hysteresis processing of the non-display digit in the display value $P_n$ stored in the first storage unit 41 (step ST05). The display unit 3 displays the display digit P in the display value $P_n$ stabilized by the stabilization unit 54 (see FIG. 1). The control unit 5 stores the display digit P in the display value $P_n$ displayed on the display unit 3 and the non-display digit as the previous display value $P_{n-1}$ in the second storage unit 42.

The embodiment can exert the following function and effect.

(1) Since the control unit 5 includes the filtering determination unit 52 that determines whether or not smoothing for suppression of a variation in the display value $P_n$ displayed on the display unit 3 to stabilize the display digit P is to be executed, and the filtering execution unit 53 that, when the filtering determination unit 52 has determined that smoothing is to be executed, executes the smoothing, the smoothing can be executed when the display digit P in the display value $P_n$ should be stabilized. Accordingly, the measuring device 1 can prevent delay of update of the display value $P_n$ displayed on the display unit 3, for example, due to an unsatisfactory smoothing speed. Thus, the measuring device 1 can suppress flickering of the display digit P in the display value $P_n$ displayed on the display unit 3 and, at the same time, can improve response of the measuring device 1.

(2) Since the control unit 5 includes the deviation calculation unit 51 that calculates a deviation between the display value $P_n$ and the previous display value $P_{n-1}$ and the filtering determination unit 52 determines whether or not smoothing is to be executed, based on the deviation calculated in the deviation calculation unit 51, whether or not smoothing is to be executed based on the display value $P_n$ and the previous display value $P_{n-1}$ can be determined. Thus, the control unit 5 can execute smoothing of the non-display digit in the display value $P_n$ displayed on the display unit 3 based on information stored in the storage unit 4 at proper timing.

(3) Since the control unit 5 includes the stabilization unit 54 that stabilizes the display digit P in the display value $P_n$ by rounding and hysteresis processing that is stabilization processing and the display unit 3 can display the display digit P in the display value $P_n$ stabilized in the stabilization unit 54, the stability of the display value $P_n$ can be ensured.

(4) For the smoothed display value $P'_n$, the filtering execution unit 53 can calculate the smoothed display value $P'_n$ by the formula (1) for simple product-sum operation based on the display value $P_n$, the previous display value $P_{n-1}$, and the smoothing coefficient $\alpha_n$ satisfying $0<\alpha_n<1$. Thus, in the measuring device 1 the filtering execution unit 53 can be easily implemented.

(5) Since the filtering execution unit 53 stores the smoothed display value $P'_n$, after replacement of the smoothed display value $P'_n$ with the display value $P_n$ stored in the first storage unit 41, as the display value $P_n$ so as to satisfy the formula (2) in the first storage unit 41, when the smoothing has not been executed, the display value $P_n$ is adopted as the display value $P_n$ while, when the smoothing has been executed, the smoothed display value $P'_n$ can be adopted as the display value $P_n$. The control unit 5 can execute stabilization for the non-display digit in the display value $P_n$ both when the smoothing has been executed or when the smoothing has not been executed.

(6) When the smoothing coefficient $\alpha_n$ satisfies the formula (3) based on an integer $\beta_n$ that is larger than 0, even in use of a control unit 5 having a limited arithmetic processing capacity, the filtering execution unit 53 can be implemented. Thus, the measuring device 1 can suppress flickering of the display digit P in the display value $P_n$ while realizing a lowered cost.

(7) Since the deviation calculation unit 51 calculates a deviation by the formula (4) based on the display value $P_n$ and the previous display value $P_{n-1}$, even in use of a control unit 5 having a limited arithmetic processing capacity, the deviation calculation unit 51 can be implemented. Thus, the measuring device 1 can suppress flickering of the display digit P in the display value $P_n$ while realizing a lowered cost.

(8) The display value $P_n$ and the past display value $P_{n-1}$ have a display digit P displayed on the display unit 3 and a non-display digit that is a digit lower than the display digit P and that is not displayed on the display unit 3 and the filtering execution unit 53 executes filtering for the non-display digit while the stabilization unit 54 executes stabilization for the non-display digit; therefore, processing can be executed without displaying, on the display unit 3, a variation in the display value $P_n$ caused by execution of the filtering and the stabilization. Thus, the measuring device 1 can suppress flickering of the display digit P in the display value $P_n$ displayed on the display unit 3 and, at the same time, can improve response of the measuring device 1.

(9) Since the measuring device 1 includes the deviation calculation unit 51, the filtering determination unit 52, and the filtering execution unit 53 in the present invention, even in use of a control unit 5 having a limited arithmetic processing capacity, the deviation calculation unit 51 and the filtering execution unit 53 can be implemented. Thus, the measuring device 1 can suppress flickering of the display digit P in the display value $P_n$ while realizing a lowered cost.

(10) The control unit 5 performs the deviation control step (step ST01), the filtering step (step ST02), the filtering execution step (step ST03), and the stabilization step (step ST05), and the display unit 3 displays the display digit P in the display value $P_n$ stabilized in the stabilization step (step ST05). Thus, the measuring device 1 can suppress flickering of the display digit P in the display value $P_n$ displayed on the display unit 3 and, at the same time, can improve response of the measuring device 1.

Second Embodiment

The second embodiment of the present invention will be described with reference to the drawings. In the following description, for portions that have been described above, the same reference characters are provided, and the description will be omitted.

Figure 4:
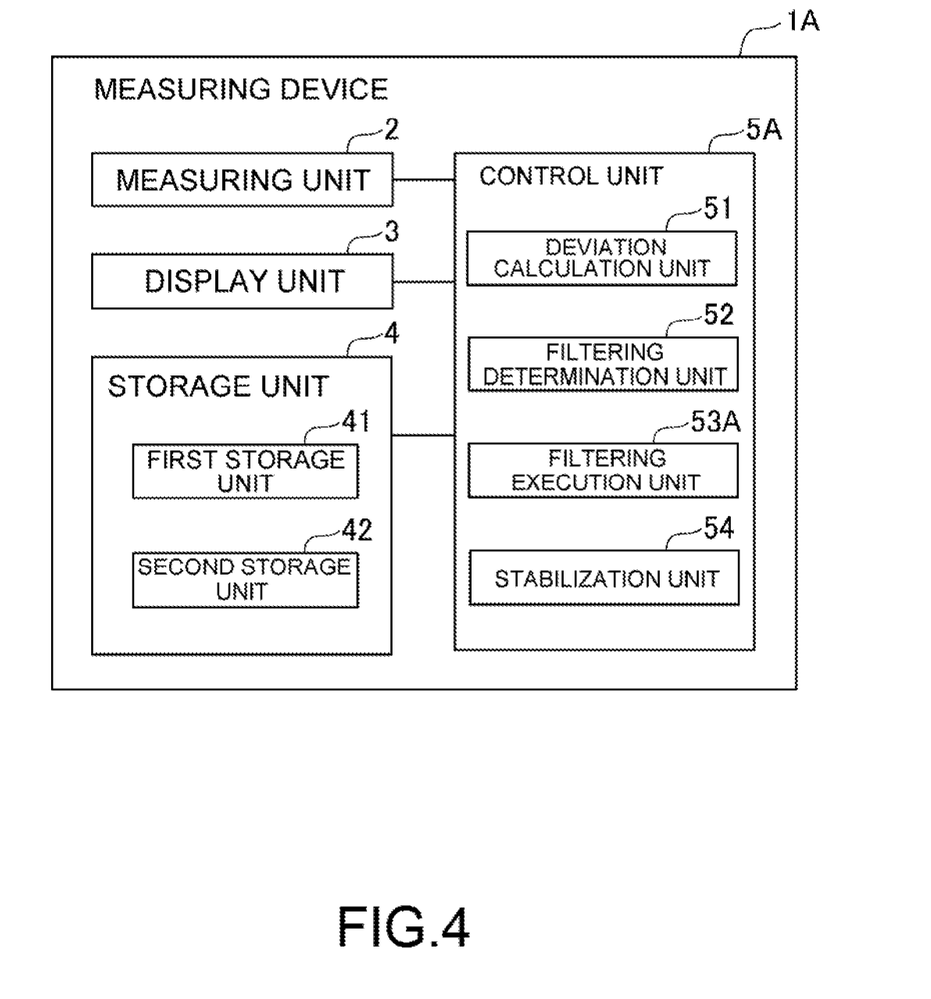
FIG. 4 is a block diagram illustrating a control unit in a measuring device in a second embodiment of the present invention.

FIG. 4 is a block diagram illustrating a control unit in a measuring device in a second embodiment of the present invention.

A measuring device 1A in the second embodiment has substantially the same construction of the measuring device 1 in the first embodiment except for a control unit 5A.

The control unit 5 in the first embodiment, as illustrated in FIG. 2, includes: the deviation calculation unit 51 that calculates a deviation; the filtering determination unit 52 that determines whether or not filtering is to be executed; the filtering execution unit 53 that calculates the smoothed display value $P'_n$ by the formula (1) based on the display value $P_n$ having the display digit P and the non-display digit, the previous display value $P_{n-1}$ having the display digit P and the non-display digit, and the smoothing coefficient $\alpha_n$ satisfying the formula (3) based on an integer $\beta_n$ and $0<\alpha_n<1$, and executes the display value storing step; and the stabilization unit 54 that performs stabilization for the non-display digit in the display value $P_n$ to stabilize the display digit P in the display value $P_n$.

The second embodiment is different from the first embodiment in that the control unit 5A includes a filtering execution unit 53A that calculates the smoothed display value $P'_n$ using a smoothing coefficient $\alpha_n$ different from the smoothing coefficient $\alpha_n$ used in the filtering execution unit 53 in the first embodiment.

Figure 5:
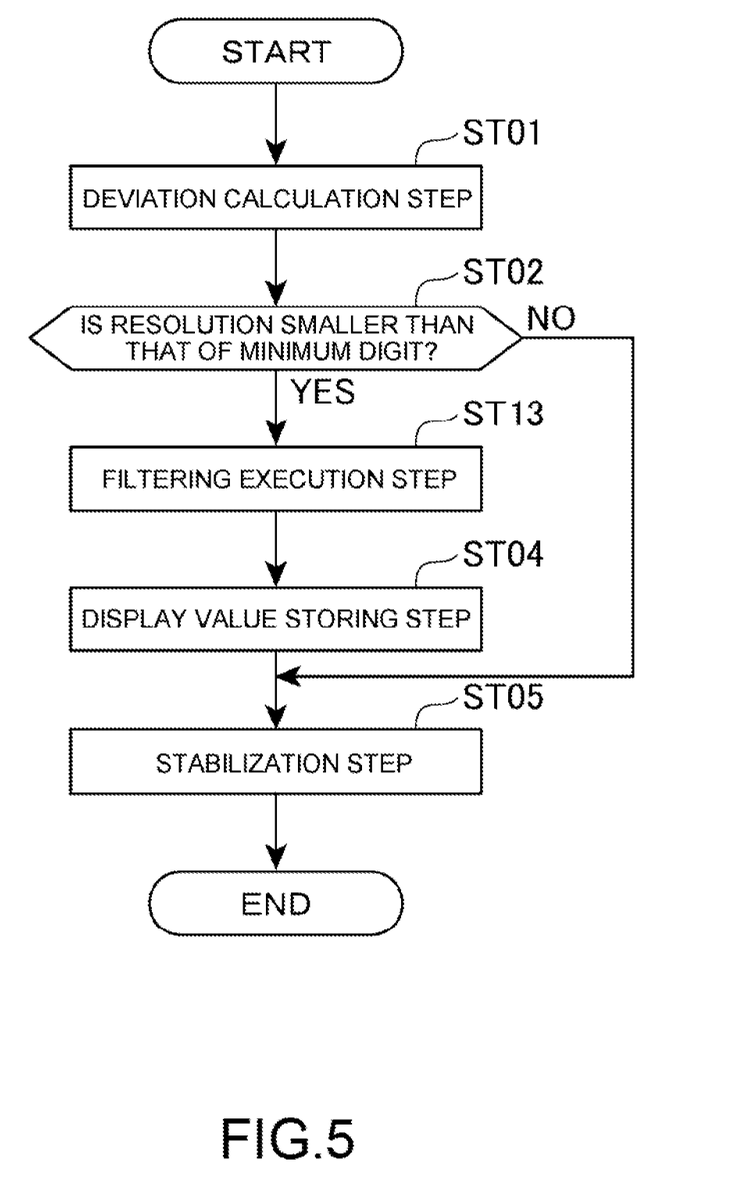
FIG. 5 is a flow chart illustrating a method of controlling the measuring device.

FIG. 5 is a flow chart illustrating a method of controlling the measuring device.

The method of controlling the measuring device 1A will be described with reference to FIG. 5.

The filtering execution unit 53A in the control unit 5A in the measuring device 1A, as illustrated in FIG. 5, when YES in step ST02, calculates the smoothed display value $P'_n$ after smoothing by the formula (1) based on the display value $P_n$ having the display digit P and the non-display digit, the previous display value $P_{n-1}$ having the display digit P and the non-display digit, and the smoothing coefficient $\alpha_n$ satisfying $0<\alpha_n<1$ (step ST13).

$$P'_n = \alpha_n \times P_n + (1-\alpha_n) \times P_{n-1} \quad (1)$$

In this case, the smoothing coefficient $\alpha_n$ satisfies, for the number of times n of execution of the filtering determined in the filtering determination unit 52, the formula (3):

$$\alpha_n = \tfrac{1}{2}^{\beta n} \quad (3)$$

wherein $\beta_n=1$ for n and n+1; $\beta_n=2$ for n+2 and n+3; and $\beta_n=3$ for n+4 or more.

$$\alpha_n = \tfrac{1}{2}^{\beta n} \quad (3)$$

The second embodiment as well can exert the same function and effect as listed in (1) to 5), (7), and (8) in the first embodiment and the following additional function and effect.

(11) When the smoothing coefficient $\alpha_n$ satisfies, for the number of times n of execution of the filtering determined in the filtering determination unit, the formula (3) wherein $\beta_n=1$ for n and n+1; $\beta_n=2$ for n+2 and n+3; and $\beta_n=3$ for n+4 or more, the smoothing intensity in the smoothing in the filtering execution unit can be stepwise varied. Thus, the filtering execution unit can improve convergence on the smoothed display value $P'_n$ to realize a high resolution.

(12) The control unit 5A performs a deviation calculation step (step ST01), a filtering determination step (step ST02), a filtering execution step (step ST13), and a stabilization step (step ST05), and the display unit 3 displays the display digit P in the display value $P_n$ stabilized in the stabilization step (step ST05). Thus, the measuring device 1A can suppress flickering of the display digit P in the display value $P_n$ displayed on the display unit 3 and, at the same time, can improve response of the measuring device 1A.

Third Embodiment

The third embodiment of the present invention will be described with reference to the drawings. In the following description, for portions that have been described above, the same reference characters are provided, and the description will be omitted.

Figure 6:
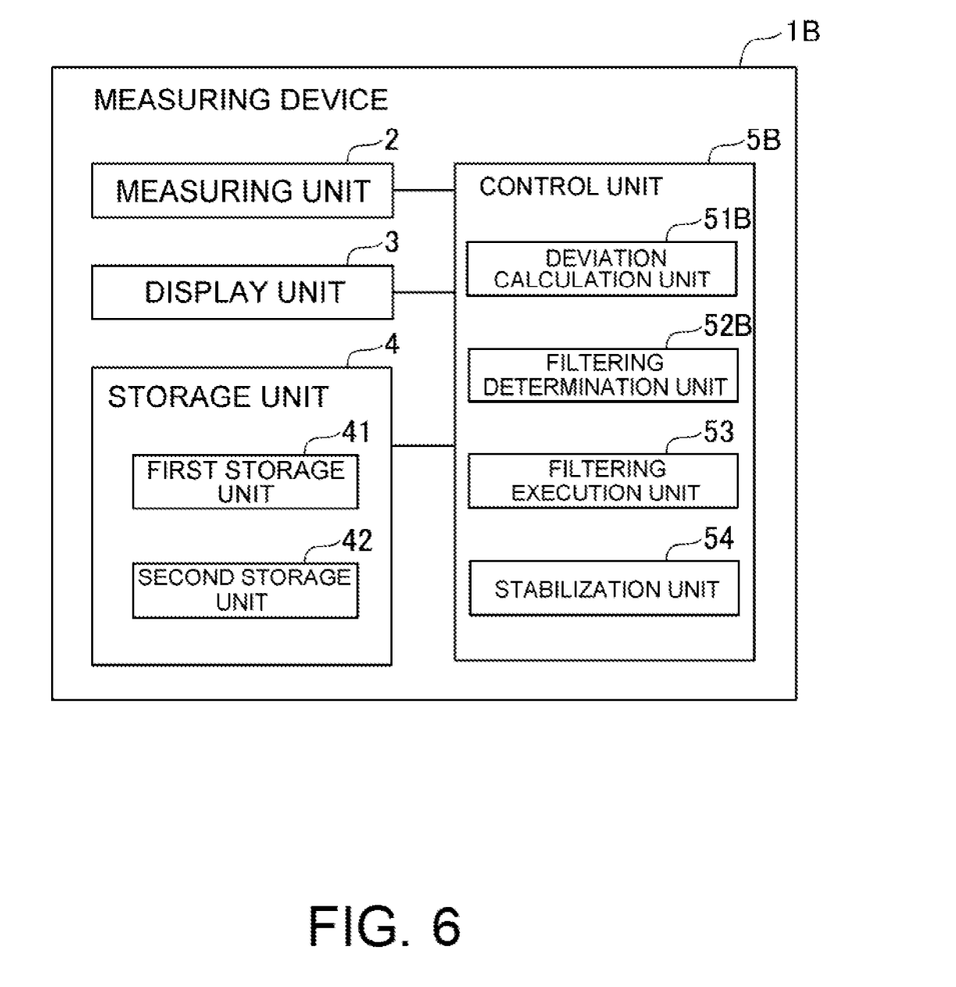
FIG. 6 is a block diagram illustrating a control unit in a measuring device in a third embodiment of the present invention.

FIG. 6 is a block diagram illustrating a control unit in a measuring device in a third embodiment of the present invention.

A measuring device 1B in the third embodiment has substantially the same construction of the measuring device 1 in the first embodiment except for a control unit 5B.

The control unit 5 in the first embodiment, as illustrated in FIG. 2, includes: the deviation calculation unit 51 that calculates a deviation by the formula (4); the filtering determination unit 52 that determines, based on the deviation calculated in the deviation calculation unit 51, whether or not smoothing is to be executed; the filtering execution unit 53 that calculates the smoothed display value $P'_n$ and that executes the display value storing step; and the stabilization unit 54 that performs stabilization for the non-display digit in the display value $P_n$ to stabilize the display digit P in the display value $P_n$.

The third embodiment is different from the first embodiment in that the control unit 5B includes a deviation calculation unit 51B that calculates a deviation using a calculation method different from the formula (4) used in the deviation calculation unit 51 in the first embodiment, and a filtering determination unit 52B that determines whether or not smoothing is to be executed based on the deviation calculated in the deviation calculation unit 51B.

Figure 7:
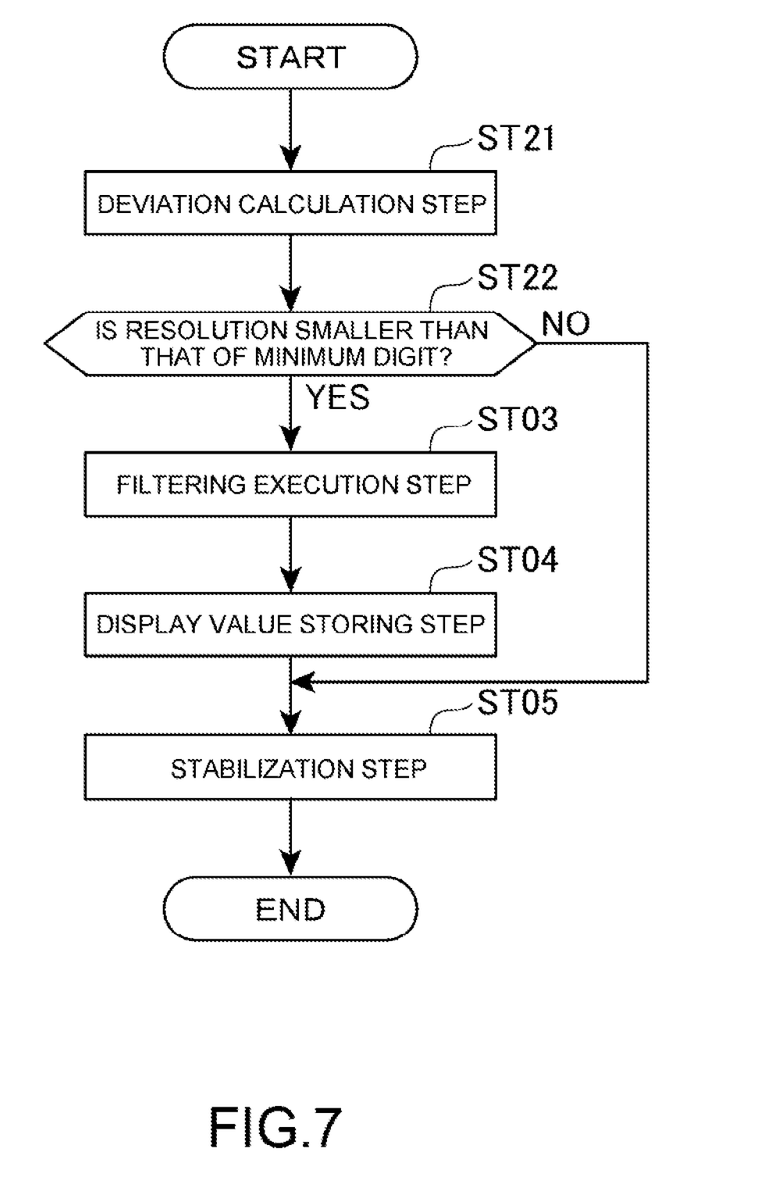
FIG. 7 is a flow chart illustrating a method of controlling the measuring device.

FIG. 7 is a flow chart illustrating a method of controlling the measuring device.

The method of controlling the measuring device 1B will be described with reference to FIG. 7.

The deviation calculation unit 51B in the control unit 5B in the measuring device 1B, as illustrated in FIG. 7, calculates a deviation by a formula (5) based on the positive integer k, the display value $P_n$ having the display digit and the non-display digit and the previous display value $P_{n-1}$ having the display digit P and the non-display digit (step ST21).

$$\text{deviation} = k \times \text{standard deviation}(P_n, P_{n-1}, \ldots, P_1, P_0) \quad (5)$$

Next, the filtering determination unit 52B executes a filtering determination step of, based on the deviation calculated in the deviation calculation unit 51B, whether or not smoothing is to be executed. Specifically, the filtering determination unit 52B determines whether or not the deviation is smaller than the resolution of the minimum digit in the non-display digit in the display value $P_n$ (step ST22).

The third embodiment as well can exert the same function and effect as listed in (1) to (6), and (8) in the first embodiment and the following additional function and effect.

(13) Since the deviation calculation unit 51B calculates a deviation by the formula (5) based on the positive integer k, the display value $P_n$ having the display digit P and the non-display digit and the previous display value $P_{n-1}$ having the display digit P and the non-display digit, the filtering determination unit 52B can properly determine whether or not the smoothing is to be executed. Thus, the control unit 5B can execute smoothing of the non-display digit in the display value $P_n$ at proper timing.

(14) The control unit 5B performs a deviation calculation step (step ST21), a filtering determination unit (step ST22), a filtering execution step (step ST03), and a stabilization step (step ST05), and the display unit 3 displays the display digit P in the display value $P_n$ stabilized in the stabilization step (step ST05). Thus, the measuring device 1B can suppress flickering of the display digit P in the display value $P_n$ displayed on the display unit 3 and, at the same time, can improve response of the measuring device 1B.

Variation of Embodiment

The present invention is not limited to the above embodiments, and variation, modification and the like are embraced in the present invention as far as the object of the present invention can be attained.

For example, in the embodiments, the measuring devices 1, 1A, and 1B are dial gages. Alternatively, the measuring devices may include, for example, calipers or indicators and linear scales. In the measuring devices 1, 1A and 1B, the form and the type are not particularly limited, and other forms and types of the measuring device may be utilized as far as the measuring device includes a display unit that displays measurement results.

In the embodiments, the control units 5, 5A and 5B include the deviation calculation unit 51, 51B and the stabilization unit 54. However, the control unit may not include the deviation calculation unit and the stabilization unit. In this case, the filtering determination unit may determine whether or not filtering is to be executed based on values of sensors or the like.

Further, the control unit may include any combination of the deviation calculation unit, the filtering determination unit, the filtering execution unit, and the stabilization execution unit described in the embodiments, and the control unit may be constructed by any combination. In summary, the control unit may have any construction as far as the control unit includes the filtering determination unit that determines whether or not filtering is to be executed, and the filtering execution unit that executes filtering when the filtering determination unit has determined that filtering is to be executed.

In the embodiments, each of the filtering execution units 53, and 53A executes smoothing as the filtering. However, the filtering may be executed by any filter that can execute processing that suppresses a variation in the display value $P_n$.

Further, in the first embodiment and the third embodiment, the filtering execution unit 53 executes smoothing using the smoothing coefficient $\alpha_n$ satisfying the formula (3) based on an integer $\beta_n$ that is larger than 0, and, in the second embodiment, the filtering execution unit 53A executes smoothing using the smoothing coefficient $\alpha_n$ satisfying the formula (3) for the number of times n of execution of the filtering determined in the filtering determination unit 52, formula (3) wherein $\beta_n=1$ for n and n+1; $\beta_n=2$ for n+2 and n+3; and $\beta_n=3$ for n+4 or more. However, the filtering execution unit may execute smoothing using any smoothing coefficient $\alpha_n$.

In each of the embodiments, the first storage unit 41 in the storage unit 4 stores the display value $P_n$ having the display digit P and the non-display digit and the second storage unit 42 stores the previous display value $P_{n-1}$ having the display digit P and the non-display digit. Alternatively, the first storage unit and the second storage unit may store only the display digit in the display value $P_n$. The second storage unit 42 in the storage unit 4 stores the previous display value $P_{n-1}$. Alternatively, the second storage unit may store not only one display value (the previous display value $P_{n-1}$) but also a plurality of display values. In summary, the first storage unit may be any storage unit that stores the display value displayed on the display unit, and the second storage unit may be any storage unit that stores the past display value displayed on the display unit.

In the embodiments, the display value $P_n$ and the past display value $P_{n-1}$ have a display digit P displayed on the display unit 3 and the non-display digit that is a digit lower than the display digit P and that is not displayed on the display unit 3. The display value $P_n$ and the past display value $P_{n-1}$ may have only the display digit and may not have the non-display digit. In this case, the filtering execution unit and the stabilization unit may execute filtering and stabilization for the minimum digit in the display digit in the display value $P_n$ and the previous display value $P_{n-1}$.

The filtering execution unit 53, 53A and the stabilization unit 54 execute smoothing and stabilization for the minimum digit in the non-display digit in the display value $P_n$. The filtering execution unit and the stabilization unit may execute filtering and stabilization for any digit in the display value $P_n$. In summary, the filtering execution unit may be any filtering execution unit that executes filtering for suppression of a variation in the display value $P_n$ displayed on the display unit, and the stabilization unit may be any stabilization unit that stabilizes the display value $P_n$ displayed on the display unit.

In the embodiments, the stabilization unit 54 executes rounding and hysteresis processing. The stabilization unit, however, may stabilize the display value by any processing that can execute stabilization to stabilize the display value.

In the first embodiment and the second embodiment, the deviation calculation unit 51 calculates the deviation by the formula (4), and, in the third embodiment, the deviation calculation unit 51B calculates the deviation by formula (5). The deviation calculation unit, however, may calculate the deviation by any calculation method as long as the deviation between the display value and the past display value can be calculated.

Figure 8A:
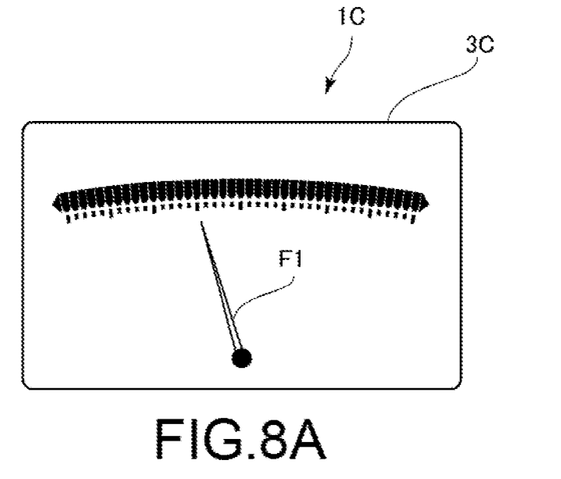
FIG. 8A is a diagram illustrating a display unit in an indicator such as a meter.
Figure 8B:
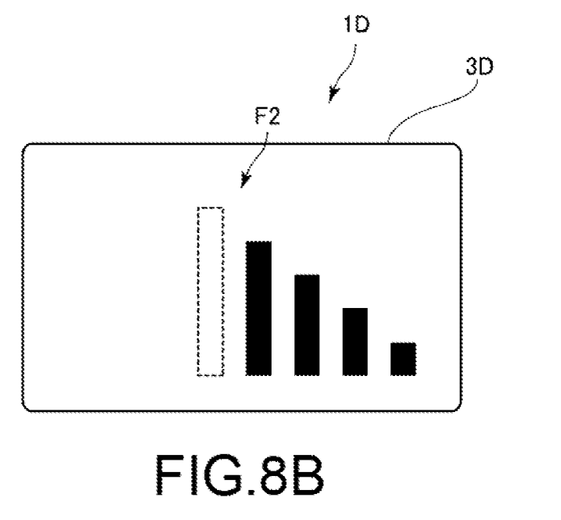
FIG. 8B is a diagram illustrating a display unit in a measuring device that displays measurement results by an increase or decrease in a scale.

FIGS. 8A and 8B are diagrams illustrating a variation of the display value in the display unit of the present invention. Specifically, FIG. 8A is a diagram illustrating the display unit in an indicator such as a meter. Further, FIG. 8B is a diagram illustrating a display unit in a measuring device that displays measurement results by an increase or decrease in a scale.

In the embodiments, the display unit 3 displays measurement results using specific figures for the display digit P in the display value $P_n$. The display unit 3C in the measuring device IC, as illustrated in FIG. 8A, is different from that in the embodiments in that the display value $P_n$ processed in the present invention is displayed as the movement of a needle F1 in the indicator. Further, the display unit 3D in the measuring device 1D, as illustrated in FIG. 8B, is different from that in the embodiment in that the display value $P_n$ processed in the present invention is displayed as an increase or decrease of a scale F2. In summary, the display unit may have any construction as long as the display unit can display measurement results calculated by the control unit.

INDUSTRIAL APPLICABILITY

As described above, the present invention is suitable for use in a measuring device including a display unit that displays information, and a method of controlling the same.

What is claimed is:
1. A measuring device comprising:
a storage that stores information about the measuring device;
control circuitry configured to calculate a measurement result; and
a display that displays the measurement result calculated by the control circuitry, wherein
the control circuitry is further configured to:
determine whether or not filtering for suppression of a variation in a display value displayed on the display is to be executed,
execute the filtering in response to determining that the filtering is to be executed, and
execute stabilization to stabilize the display value by performing rounding and hysteresis processing for non-display digits of the display value,
wherein the storage comprises:
a first storage that stores the display value, and
a second storage that stores a past display value displayed on the display, and
wherein the control circuitry is further configured to
calculate a deviation between the display value and the past display value,
determine, based on the calculated deviation, whether or not the filtering is to be executed, and
wherein the control circuitry is further configured to execute, for a smoothed display value $P'_n$ that is a display value obtained by executing the filterinn, calculation by a formula (1) based on the display value $P_n$, the past display value $P_{n-1}$, and a smoothing coefficient satisfying $0<\alpha_n<1$:

$$P'_n=\alpha_n\times P_n+(1-\alpha_n)\times P_{n-1} \quad (1)$$

and
the smoothed display value $P'_n$ is replaced with the display value $P_n$, stored in the first storage to store the smoothed display value $P'_n$ as the display value $P_n$ in the first storage to satisfy formula (2):

$$P_n=P'_n \quad (2).$$

2. The measuring device according to claim 1, wherein the smoothing coefficient $\alpha_n$ satisfies, based on an integer $\beta_n$ that is larger than 0, a formula (3):

$$\alpha_n=\frac{1}{2}^{\beta n} \quad (3).$$

3. The measuring device according to claim 1, wherein the smoothing coefficient $\alpha_n$ satisfies, for the number of times n of execution of the determined filtering, a formula (3):

$$\alpha_n=1/2^{\beta n} \quad (3)$$

wherein $\beta_n=1$ for n and n+1; $\beta_n=2$ for n+2 and n+3; and $\beta_n=3$ for n+4 or more.

4. The measuring device according to claim 1, wherein the control circuitry is further configured to calculate the deviation by a formula (4):

$$\text{deviation} = |P_n - P_{n-1}| \qquad (4)$$

wherein $P_n$ represents the display value; and $P_{n-1}$ represents the past display value.

5. The measuring device according to claim 1, wherein the control circuitry is further configured to calculate the deviation by a formula (5) based on a positive integer k, the display value $P_n$, and the past display value $P_{n-1}$:

$$\text{deviation} = k \times \text{standard deviation}\ (P_n, P_{n-1}, \ldots, P_1, P_0) \qquad (5).$$

6. The measuring device according to claim 1, wherein the display value and the past display value have a display digit displayed on the display and a non-display digit of the non-display digits that is a digit lower than the display digit and is not displayed on the display, the control circuitry is further configured to execute filtering of the non-display digit, and execute stabilization of the non-display digit.

7. A measuring device comprising:
a storage that stores information about the measuring device;
control circuitry configured to calculate measurement results; and
a display that displays the measurement results calculated by the control circuitry, wherein
the control circuitry is further configured to:
calculate a deviation between a display value and a past display value by a formula (4):

$$\text{deviation} = |P_n - P_{n-1}| \qquad (4),$$

wherein $P_n$ represents the display value, and $P_{n-1}$ represents the past display value,
determine, based on the calculated deviation, whether or not filtering for suppression of a variation in display values displayed on the display is to be executed, and
execute the filtering in response to a determination that the filtering is to be executed,
wherein the control circuitry is further configured to execute, for a smoothed display value $P'_n$ that is a display value obtained by executing the filtering, calculation by a formula (1) based on the display value $P_n$, the past display value $P_{n-1}$, and a smoothing coefficient satisfying $0 < \alpha_n < 1$:

$$P'_n = \alpha_n \times P_n + (1-\alpha_n) \times P_{n-1} \qquad (1),$$

the smoothed display value $P'_n$ is replaced with the display value $P_n$ stored in the first storage to store the smoothed display value $P'_n$ as the display value $P_n$ in the first storage to satisfy formula (2):

$$P_n = P'_n \qquad (2), \text{ and}$$

the smoothing coefficient $\alpha_n$ satisfies, based on an integer $\beta_n$ that is larger than 0, a formula (3):

$$\alpha_n = 1/2^{\beta_n} \qquad (3).$$

8. A method of controlling a measuring device comprising:
storing, in a storage, information about the measuring device;
calculating, using control circuitry, a measurement result; and
displaying, on a display, the measurement result calculated by the control circuitry, wherein
the storage comprises:
a first storage that stores a display value; and
a second storage that stores a past display value displayed on the display, and
wherein the method further comprises:
calculating, using the control circuitry, a deviation between the display value and the past display value,
determining, based on the deviation calculated in the calculating, whether or not filtering for suppression of a variation in a display value displayed on the display is to be executed,
executing the filtering when a determination is made that the filtering is to be executed; and
executing stabilization by performing rounding and hysteresis processing for non-display digits of the display value, wherein
the display displays the display value stabilized by the stabilization in the executing the stabilization,
wherein the control circuitry is further configured to execute, for a smoothed display value $P'_n$ that is a display value obtained by executing the filtering, calculation by a formula (1) based on the display value $P_n$, the past display value $P_{n-1}$, and a smoothing coefficient satisfying $0 < \alpha_n < 1$:

$$P'_n = \alpha_n \times P_n + (1-\alpha_n) \times P_{n-1} \qquad (1)$$

and
the smoothed display value $P'_n$ is replaced with the display value $P_n$ stored in the first storage to store the smoothed display value $P'_n$ as the display value $P_n$ in the first storage to satisfy formula (2):

$$P_n = P'_n \qquad (2).$$

* * * * *